United States Patent
Nakatsuka et al.

(10) Patent No.: US 8,363,166 B2
(45) Date of Patent: Jan. 29, 2013

(54) IMAGE QUALITY IMPROVING DEVICE AND METHOD

(75) Inventors: Sachiko Nakatsuka, Kanagawa-ken (JP); Kenji Kubota, Kanagawa-ken (JP); Hideki Aiba, Ibaraki-ken (JP); Junichi Hasegawa, Kanagawa-ken (JP); Satoshi Toyoshima, Ibaraki-ken (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 206 days.

(21) Appl. No.: 13/054,012

(22) PCT Filed: Jul. 15, 2009

(86) PCT No.: PCT/JP2009/062787
§ 371 (c)(1),
(2), (4) Date: Jan. 13, 2011

(87) PCT Pub. No.: WO2010/008011
PCT Pub. Date: Jan. 21, 2010

(65) Prior Publication Data
US 2011/0267540 A1 Nov. 3, 2011

(30) Foreign Application Priority Data
Jul. 15, 2008 (JP) ............... P2008-183520

(51) Int. Cl.
*H04N 5/21* (2006.01)
*H04N 1/409* (2006.01)
(52) U.S. Cl. ........ 348/625; 348/627; 348/607; 348/606; 348/618; 382/264; 382/275

(58) Field of Classification Search .................. 348/625, 348/627, 607, 606, 622, 618; 382/263, 264, 382/266, 275; 358/447, 463, 532
See application file for complete search history.

(56) References Cited

U.S. PATENT DOCUMENTS
6,771,320 B2 * 8/2004 Choi ............................ 348/625
(Continued)

FOREIGN PATENT DOCUMENTS
EP   1 217 826 A2   6/2002
EP   1 777 656 A1   4/2007
(Continued)

OTHER PUBLICATIONS

Search Report issued on Jul. 1, 2011 in the counterpart European application.

*Primary Examiner* — Jefferey Harold
*Assistant Examiner* — Jean W Desir
(74) *Attorney, Agent, or Firm* — Nath, Goldberg & Meyer; Jerald L. Meyer; Stanley N. Protigal

(57) ABSTRACT

A Gaussian filter 2 having a first cutoff frequency extracts a low frequency component signal of a video signal. A subtracter 3 extracts a high frequency component signal by subtracting the low frequency component signal from the video signal. A low pass filter 5 having a second cutoff frequency higher than the first cutoff frequency extracts a lower high frequency component signal, which is a low-frequency-side signal of the high frequency component signal. A multiplier 6 generates a corrected component signal by multiplying the lower high frequency component signal by a predetermined gain G1. An adder 7 adds the corrected component signal to the video signal.

24 Claims, 9 Drawing Sheets

U.S. PATENT DOCUMENTS

| | | |
|---|---|---|
| 2005/0058365 A1 | 3/2005 | Wang et al. |
| 2011/0019095 A1 * | 1/2011 | He et al. .................. 348/607 |

FOREIGN PATENT DOCUMENTS

| | | |
|---|---|---|
| JP | 2-4367 U | 1/1990 |
| JP | 3-285472 A | 12/1991 |
| JP | 04-000973 A | 1/1992 |
| JP | 04-022224 A | 1/1992 |
| JP | 05-167889 A | 7/1993 |
| JP | 05-344385 A | 12/1993 |
| JP | 05-344386 A | 12/1993 |
| JP | 07-177386 A | 7/1995 |
| JP | 08-111792 A | 4/1996 |
| JP | 2002-190968 A | 7/2002 |
| JP | 2004-120741 A | 4/2004 |
| WO | 2005/117414 A1 | 12/2005 |

* cited by examiner

IMAGE QUALITY IMPROVING DEVICE AND METHOD

This is a National Phase Application filed under 35 U.S.C. 371 as a national stage of PCT/JP2009/062787, filed Jul. 15, 2009, and claims priority benefit from Japanese Application No. P2008-183520, filed Jul. 15, 2008, the content of each of which is hereby incorporated by reference in its entirety.

TECHNICAL FIELD

The present invention relates to an image quality improving device and an image quality improving method for improving image quality by correcting an edge (contour) of a video signal.

BACKGROUND ART

Conventionally, as a method of improving image quality of a video signal, enhance processing to improve a feeling of sharpness of a video is performed by attaching a shoot component to an edge of a video signal to make the edge steep. An enhancer that performs this enhance processing is a device that extracts a high frequency component of a video signal using a high pass filter having a comparatively short tap length of several to ten and several taps, generates a shoot component based on the extracted high frequency component, and attaches the shoot component to the video signal. In Patent Document 1, such an enhancer (image quality improving device) is described.

Here, it is described that the high frequency component is extracted by the high pass filter. However, in practice, there is a case where intermediate and high frequency components including an intermediate frequency component are extracted and the intermediate and high frequency components are emphasized. When the peak frequency of the passband of the high pass filter is shifted toward an intermediate frequency side, the intermediate and high frequency components are emphasized. Further, when the gain is increased in order to improve the effect of emphasis of the high frequency component, the intermediate frequency component is extracted accompanying the high frequency component. As a result, the intermediate and high frequency components are emphasized. Hereinafter, explanation is given on the assumption that the conventional enhancer emphasizes the high frequency component even when it emphasizes, in fact, the high frequency component including the intermediate frequency component.

PRIOR ART DOCUMENT

Patent Document

Patent Document 1: Japanese Patent Laid-Open No. 1993-344385

SUMMARY OF THE INVENTION

Technical Problem

According to the conventional enhancer that uses the high pass filter described above, it is possible to improve image quality by emphasizing a high frequency component of a video signal. However, in recent years, the further improvement in image quality is demanded with growing in size of the screen of an image display device, and image quality improving device and method capable of improving a feeling of contrast are demanded as the effect of image quality improvement different from that of the conventional enhancer.

The present invention has been made in view of such circumstances and an object thereof is to provide an image quality improving device and an image quality improving method capable of improving a feeling of contrast. Another object of the present invention is to provide an image quality improving device and an image quality improving method capable of improving both a feeling of sharpness and a feeling of contrast.

Solution to Problem

In order to solve the problems of the prior art described above, according to a first aspect of the present invention, there is provided an image quality improving device characterized by comprising a first low pass filter having a first cutoff frequency and extracting a low frequency component signal of a video signal that is input; a subtracter extracting a high frequency component signal by subtracting the low frequency component signal from the input video signal; a second low pass filter having a second cutoff frequency higher than the first cutoff frequency and extracting a lower high frequency component signal, which is a low-frequency-side signal of the high frequency component signal; a multiplier generating a corrected component signal by multiplying the lower high frequency component signal by a predetermined gain; and an adder adding the corrected component signal to the input video signal.

According to a second aspect of the present invention, there is provided an image quality improving device characterized by comprising a first low pass filter having a first cutoff frequency and extracting a low frequency component signal of a video signal that is input; a subtracter extracting a first high frequency component signal by subtracting the low frequency component signal from the input video signal; a second low pass filter having a second cutoff frequency higher than the first cutoff frequency and extracting a lower high frequency component signal, which is a low-frequency-side signal of the first high frequency component signal; a first multiplier generating a first corrected component signal by multiplying the lower high frequency component signal by a first gain; a high pass filter extracting a second high frequency component signal from the input video signal; a second multiplier generating a second corrected component signal by multiplying the second high frequency component signal by a second gain; and an adder adding the first and second corrected component signals to the input video signal.

According to a third aspect of the present invention, there is provided an image quality improving device characterized by comprising a high pass filter extracting a first high frequency component signal from a video signal that is input; a first multiplier generating a first corrected component signal by multiplying the first high frequency component signal by a first gain; a first adder adding the first corrected component signal to the input video signal; a first low pass filter having a first cutoff frequency and extracting a low frequency component signal of a video signal output from the adder; a subtracter extracting a second high frequency component signal by subtracting the low frequency component signal from the video signal output from the adder; a second low pass filter having a second cutoff frequency higher than the first cutoff frequency and extracting a lower high frequency component signal, which is a low-frequency-side signal of the second high frequency component signal; a second multiplier generating a second corrected component signal by multiplying the lower high frequency component signal by a second gain; and a second adder adding the second corrected component signal to the video signal output from the adder.

According to a fourth aspect of the present invention, there is provided an image quality improving device characterized by comprising a first low pass filter having a first cutoff frequency and extracting a low frequency component signal of a video signal that is input; a subtracter extracting a first high frequency component signal by subtracting the low frequency component signal from the input video signal; a second low pass filter having a second cutoff frequency higher than the first cutoff frequency and extracting a lower high frequency component signal, which is a low-frequency-side signal of the first high frequency component signal; a first multiplier generating a first corrected component signal by multiplying the lower high frequency component signal by a first gain; a first adder adding the first corrected component signal to the input video signal; a high pass filter extracting a second high frequency component signal from the video signal output from the first adder; a second multiplier generating a second corrected component signal by multiplying the second high frequency component signal by a second gain; and a second adder adding the second corrected component signal to the video signal output from the first adder.

According to a fifth aspect of the present invention, there is provided an image quality improving method characterized by comprising a first step of extracting a low frequency component signal of a video signal by a first low pass filter having a first cutoff frequency; a second step of extracting a high frequency component signal by subtracting the low frequency component signal from the video signal; a third step of extracting a lower high frequency component signal, which is a low-frequency-side signal of the high frequency component signal, by a second low pass filter having a second cutoff frequency higher than the first cutoff frequency; a fourth step of generating a first corrected component signal by multiplying the lower high frequency component signal by a first gain; and a fifth step of outputting a corrected video signal in which the band component of the lower high frequency component signal in the band of the video signal is emphasized by adding the first corrected component signal to the video signal.

EFFECTS OF THE INVENTION

According to the image quality improving device and method of the present invention, it is possible to improve a feeling of contrast. Further, it is possible to improve both feelings of sharpness and contrast.

DESCRIPTION OF EMBODIMENTS

Embodiments of image quality improving device and method of the present invention are explained below with reference to FIG. 1 to FIG. 13.

<First Embodiment>

Figure 1:
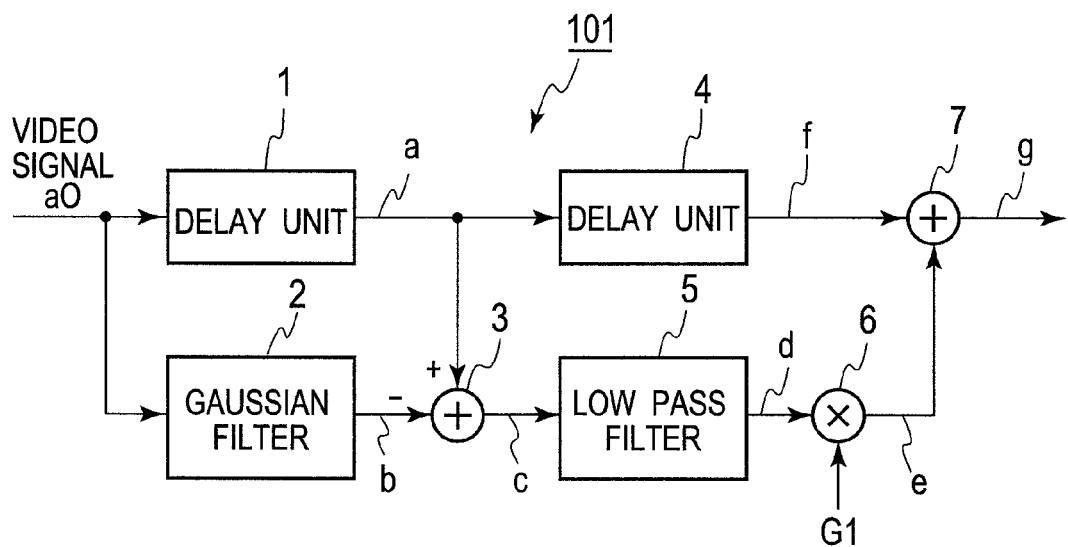
FIG. 1 is a block diagram showing a first embodiment of the present invention.
Figure 2:
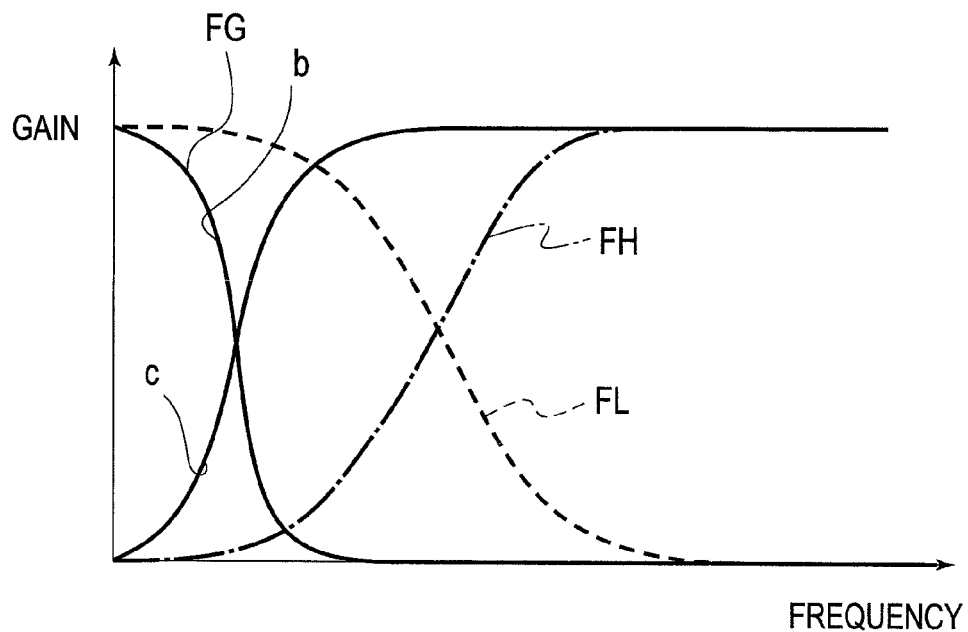
FIG. 2 is a diagram showing a frequency characteristic of a filter used in each embodiment.
Figure 3:
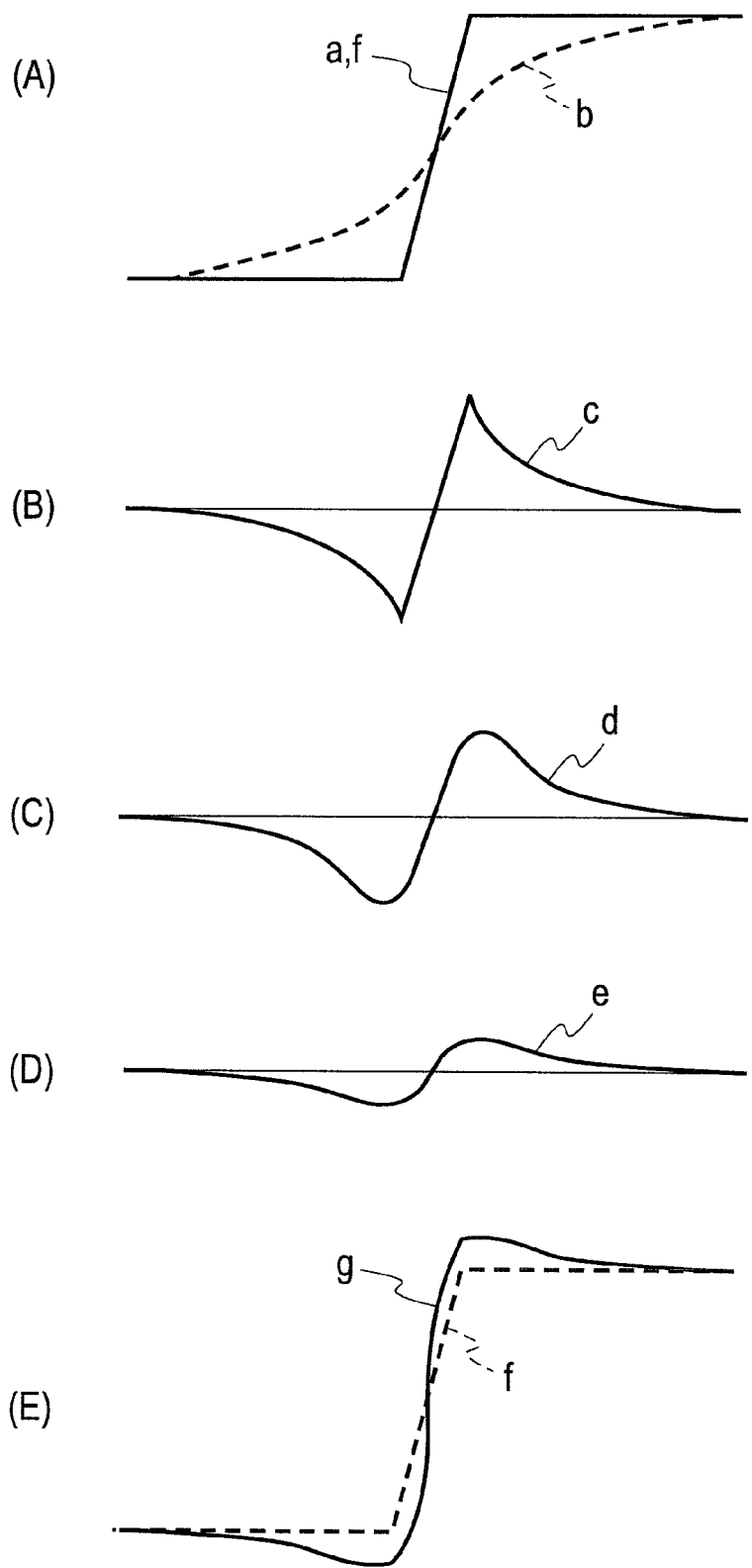
FIG. 3 is a waveform diagram for explaining the first embodiment.

FIG. 1 is a block diagram showing a first embodiment of an image quality improving device of the present invention. The configuration and operation of an image quality improving device 101 in the first embodiment are explained with reference to a frequency characteristic of each filter shown in FIG. 2 and a waveform diagram shown in FIG. 3. In FIG. 1, a video signal a0 is input to a delay unit 1 and a Gaussian filter 2. The video signal a0 may be a luminance signal or a color signal. The Gaussian filter refers to a low pass filter that extracts a very low frequency component by utilizing the Gaussian function. A frequency characteristic FG of the Gaussian filter 2 has a very low cutoff frequency as shown in FIG. 2. It may also be possible to use a low pass filter having a very low cutoff frequency and a long tap length.

The delay unit 1 generates a video signal a by delaying the video signal a0 that is input by a length of time required for the processing in the Gaussian filter 2. The Gaussian filter 2 extracts a low frequency component signal b from the input video signal a0. As shown by the solid line in FIG. 3(A), when the video signal a is an edge signal, the low frequency component signal b will have a waveform shown by the broken line in FIG. 3(A). In FIG. 2, the band of the low frequency component signal b is a band limited by the frequency characteristic FG A subtracter 3 subtracts the low frequency component signal b from the video signal a and outputs a high frequency component signal c shown in FIG. 3(B). The subtracter 3 subtracts the low frequency component signal b from the video signal a in the entire band, and therefore the band of the high frequency component signal c will be as shown in FIG. 2.

The high frequency component signal c output from the subtracter 3 is input to a low pass filter 5. A frequency characteristic FL of the low pass filter 5 is as shown in FIG. 2 and the cutoff frequency of the low pass filter 5 is higher than that of the Gaussian filter 2. An output signal d of the low pass filter 5 is a signal on a low frequency side in the high frequency component signal c extracted by the frequency characteristic FL and will have a waveform as shown in FIG. 3(C). It is assumed that the output signal d is referred to as a lower high frequency component signal. The lower high frequency component signal d is input to a multiplier 6. The multiplier 6 generates a corrected component signal e shown in FIG. 3(D) by multiplying the lower high frequency component signal d by a gain G1. The purpose of the gain G1 is to adjust the image improving effect by the image quality improving device 101 in the first embodiment and is normally a positive number more than zero and less than one.

A delay unit 4 generates a video signal f by further delaying the video signal a output from the delay unit 1 by a length of time required for the processing in the low pass filter 5 and the multiplier 6. To an adder 7, the video signal f output from the delay unit 4 and the corrected component signal e output from the multiplier 6 are input. The waveform of the video signal f is the same as that of the video signal a as shown in FIG. 3(A). The adder 7 outputs a corrected video signal g shown by the solid line in FIG. 3(E) by adding the corrected component signal e to the video signal f.

According to the image quality improving device 101 in the first embodiment, it is possible to emphasize a low frequency component (band component of the lower high frequency component signal d) rather than the high frequency component emphasized by a conventional enhancer, and therefore a shoot component having a comparatively large width is added to the periphery of an edge as a result. Consequently, a difference in signal level recognized by a human being is made larger than a difference in actual signal level, and therefore it is possible to improve the feeling of contrast. Consequently, according to the image quality improving device 101 in the first embodiment, it is possible to obtain an effect of image improvement, in which the feeling of contrast recognized by a human being is improved, different from that of the conventional enhancer.

<Second Embodiment>

Figure 4:
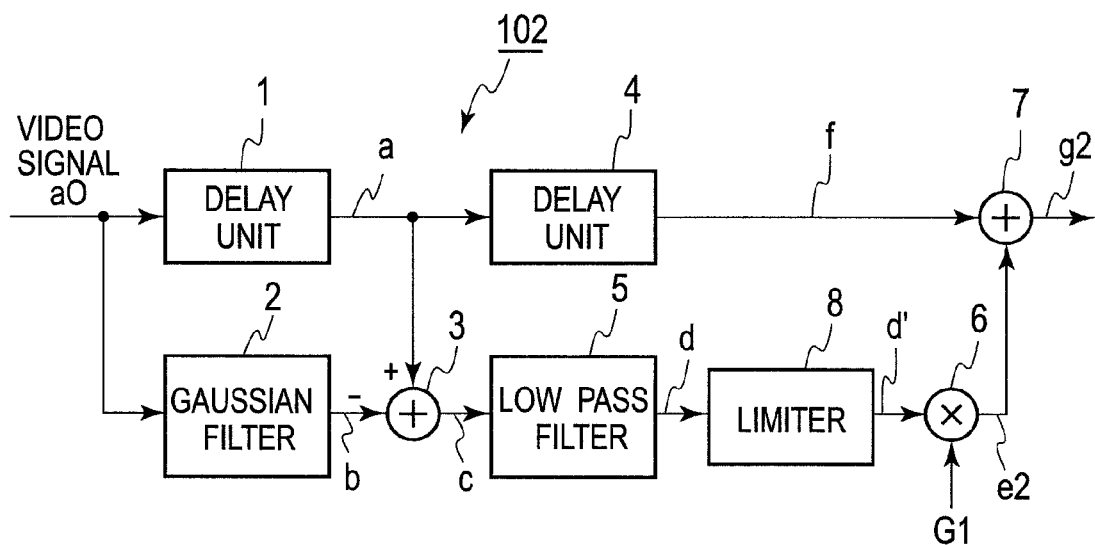
FIG. 4 is a block diagram showing a second embodiment of the present invention.

FIG. 4 is a block diagram showing a second embodiment of an image quality improving device of the present invention. In an image quality improving device 102 in the second embodiment shown in FIG. 4, the same symbol is attached to the same part as that of the image quality improving device 101 in the first embodiment shown in FIG. 1 and its explanation is omitted appropriately. In FIG. 4, the lower high frequency component signal d output from the low pass filter 5 is input to a limiter 8. The limiter 8 limits the lower high frequency component signal d based on a characteristic, to be described later, and outputs it as a lower high frequency component signal d'. The multiplier 6 multiplies the lower high frequency component signal d' by the gain G1 and outputs a corrected component signal e2. The adder 7 adds the corrected component signal e2 to the video signal f and outputs a corrected video signal g2.

Figure 5:
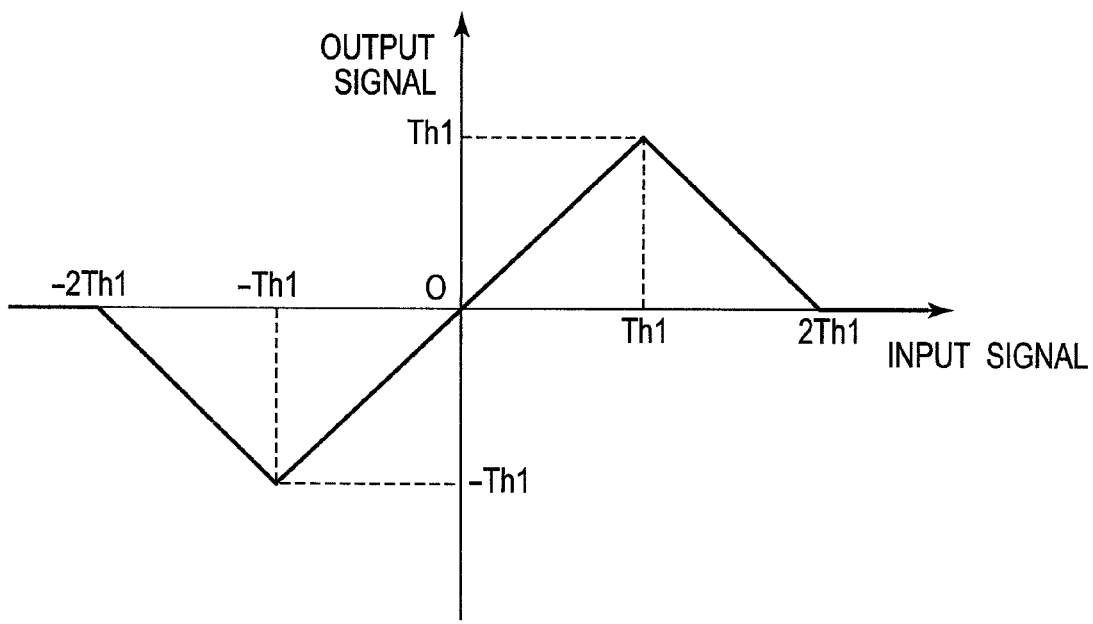
FIG. 5 is a diagram showing a first example of a limiting characteristic of a limiter used in each embodiment.

An example of the limiting characteristic of the limiter 8 is explained here. FIG. 5 is a first example of the limiting characteristic of the limiter 8. The limiting characteristic shown in FIG. 5 is that when a positive or negative input signal (that is, the lower high frequency component signal d) is a value between threshold values Th1 and −Th1, the value of the input signal is output as it is, when in a range of more than the threshold value Th1 and not more than a value 2Th1, the value of the input signal is attenuated, when in a range of not less than a value −2Th and less than the threshold value −Th1, the value of the input signal is amplified, and when it exceeds beyond the value 2Th1 or −2Th1, the value is held to zero. In this example, the slope of attenuation from the threshold value Th1 to the value 2Th1 and the slope of amplification from the threshold value −Th1 to the value −2Th1 are set to minus one, however, it may also be possible to set the absolute value of the slope less than one.

Figure 6:
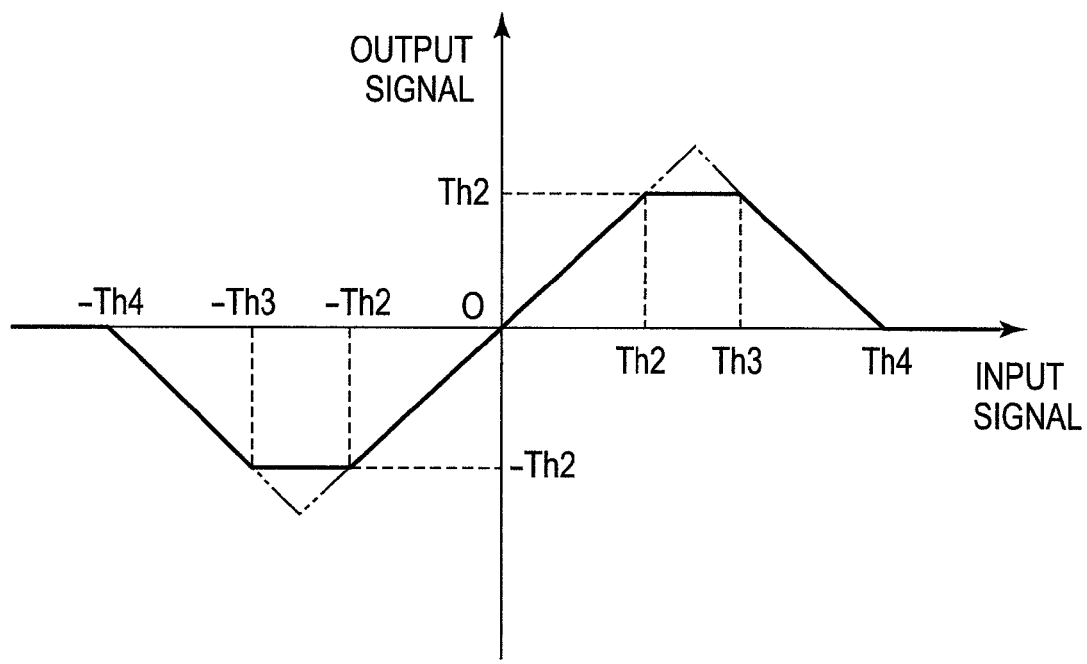
FIG. 6 is a diagram showing a second example of the limiting characteristic of the limiter used in each embodiment.

FIG. 6 is a second example of the limiting characteristic of the limiter 8. The limiting characteristic is that when the input signal is between a threshold value Th2 and a threshold value −Th2, the value of the input signal is output as it is, when in a range more than the threshold value Th2 and not more than a threshold value Th3 and in a range of less than a threshold value −Th2 and not less than a threshold value −Th3, the value is held to the values Th2 and −Th2, respectively, when in a range more than the threshold value Th3 and not more than a threshold value Th4, the value of the input signal is attenuated, when in a range of less than the threshold value −Th3 and not less than a value −Th4, the value of the input signal is amplified, and when it exceeds beyond the value Th4 or −Th4, the value is held to zero. The limiting characteristic shown in FIG. 6 is that in which the triangular characteristic is changed to a trapezoidal characteristic in the positive and negative directions by limiting the value of the output signal of the limiting characteristic in FIG. 5 by the values Th2, −Th2.

Figure 7:
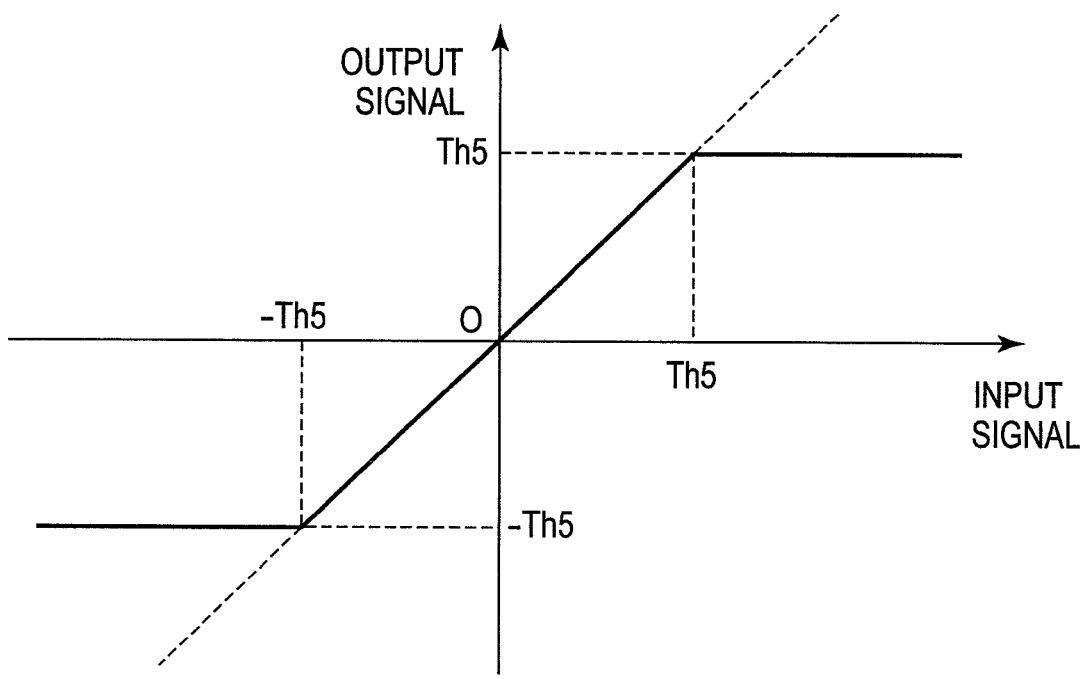
FIG. 7 is a diagram showing a third example of the limiting characteristic of the limiter used in each embodiment.
Figure 8:
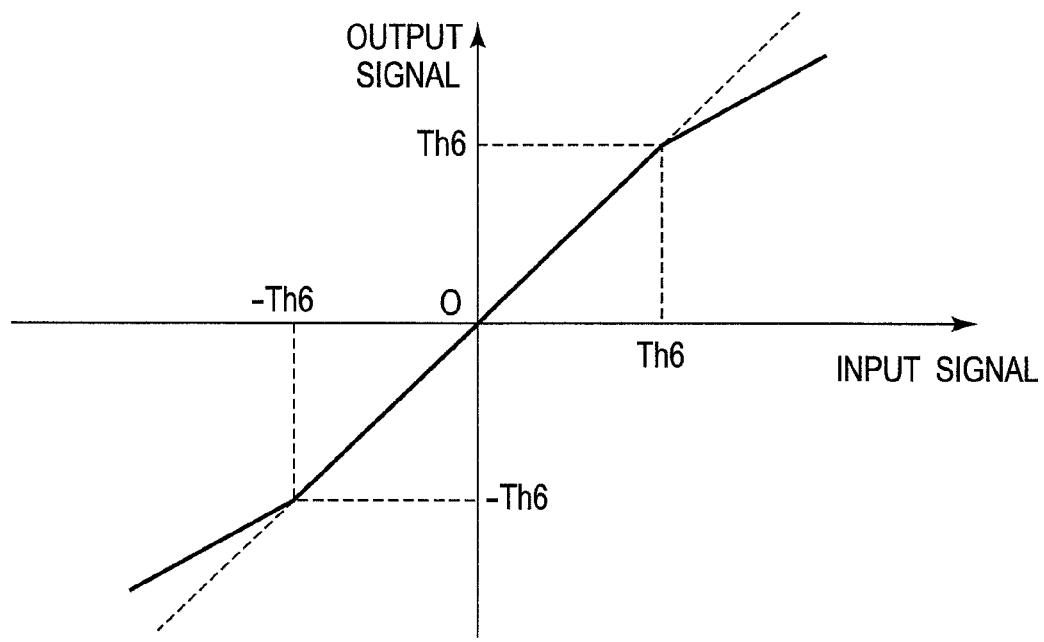
FIG. 8 is a diagram showing a fourth example of the limiting characteristic of the limiter used in each embodiment.

FIG. 7 is a third example of the limiting characteristic of the limiter 8. The limiting characteristic shown in FIG. 7 is that when the input signal is between threshold values Th5 and −Th5, the value of the input signal is output as it is and when it exceeds beyond the threshold value Th5 or −Th5, the value is held to the value Th5 or −Th5. FIG. 8 is a fourth example of the limiting characteristic of the limiter 8. The limiting characteristic shown in FIG. 8 is that when the input signal is between threshold values Th6 and −Th6, the value of the input signal is output as it is, when it exceeds beyond the threshold value Th6, the value of the input signal is attenuated according to a slope of more than zero and less than one, and when it exceeds beyond the threshold value −Th6, the value of the input signal is amplified according to a slope of more than zero and less than one. The respective threshold values in FIG. 5 to FIG. 8 may be set appropriately in accordance with the magnitude of the lower high frequency component signal d output from the low pass filter 5.

According to the image quality improving device 102 in the second embodiment, because the limiter 8 is provided, it is possible to suppress the unwanted high frequency component included in the lower high frequency component signal d when a difference in the signal level at the edge part in the video signal a0 is large, and therefore, it is possible to improve the image quality improving effect more than that of the image quality improving device 101 in the first embodiment. When it is not possible to secure a sufficient tap length of the low pass filter 5, it is preferable to provide the limiter 8. Among the limiting characteristics in FIG. 5 to FIG. 8, the limiting characteristics in FIG. 7 and FIG. 8 are preferable.

<Third Embodiment>

Figure 9:
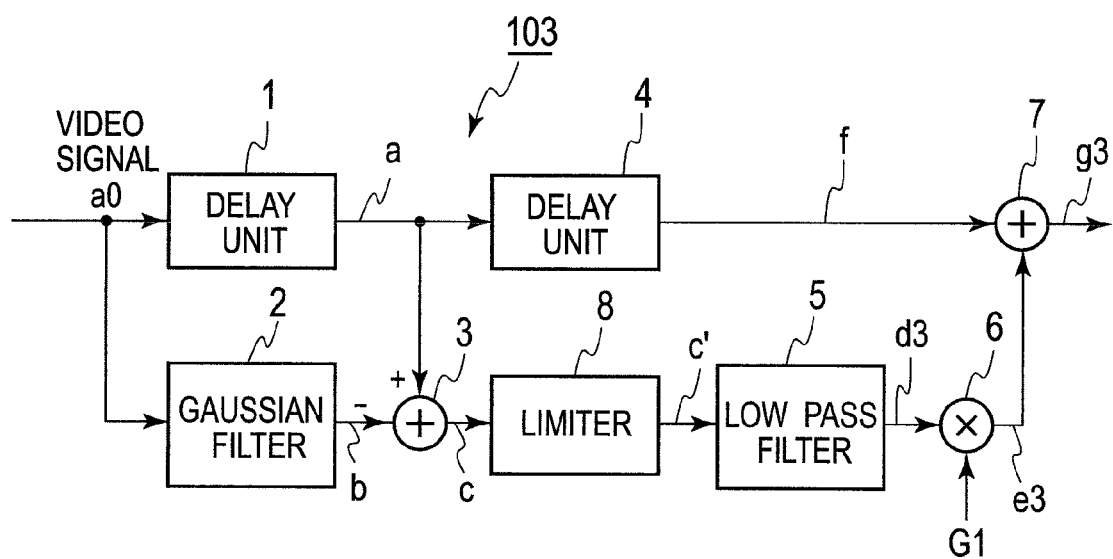
FIG. 9 is a block diagram showing a third embodiment of the present invention.

FIG. 9 is a block diagram showing a third embodiment of an image quality improving device of the present invention. In an image quality improving device 103 in the third embodiment shown in FIG. 9, the same symbol is attached to substantially the same part as that of the image quality improving device 102 in the second embodiment shown in FIG. 4 and its explanation is omitted appropriately. The image quality improving device 103 in the third embodiment is the same as the image quality improving device 102 in the second embodiment except in that the order of the low pass filter 5 and the limiter 8 is reversed. In FIG. 9, the high frequency component signal c output from the subtracter 3 is input to the limiter 8. The limiter 8 limits the high frequency component signal c based on the limiting characteristic in one of FIG. 5 to FIG. 8 described above and outputs it as a high frequency component signal c'.

The low pass filter 5 extracts a low-frequency-side signal of the input high frequency component signal c' by the frequency characteristic FL and outputs a lower high frequency component signal d3. The multiplier 6 multiplies the lower high frequency component signal d3 by the gain G1 and outputs a corrected component signal e3. The adder 7 adds the corrected component signal e3 to the video signal f and outputs a corrected image signal g3.

Figure 10:
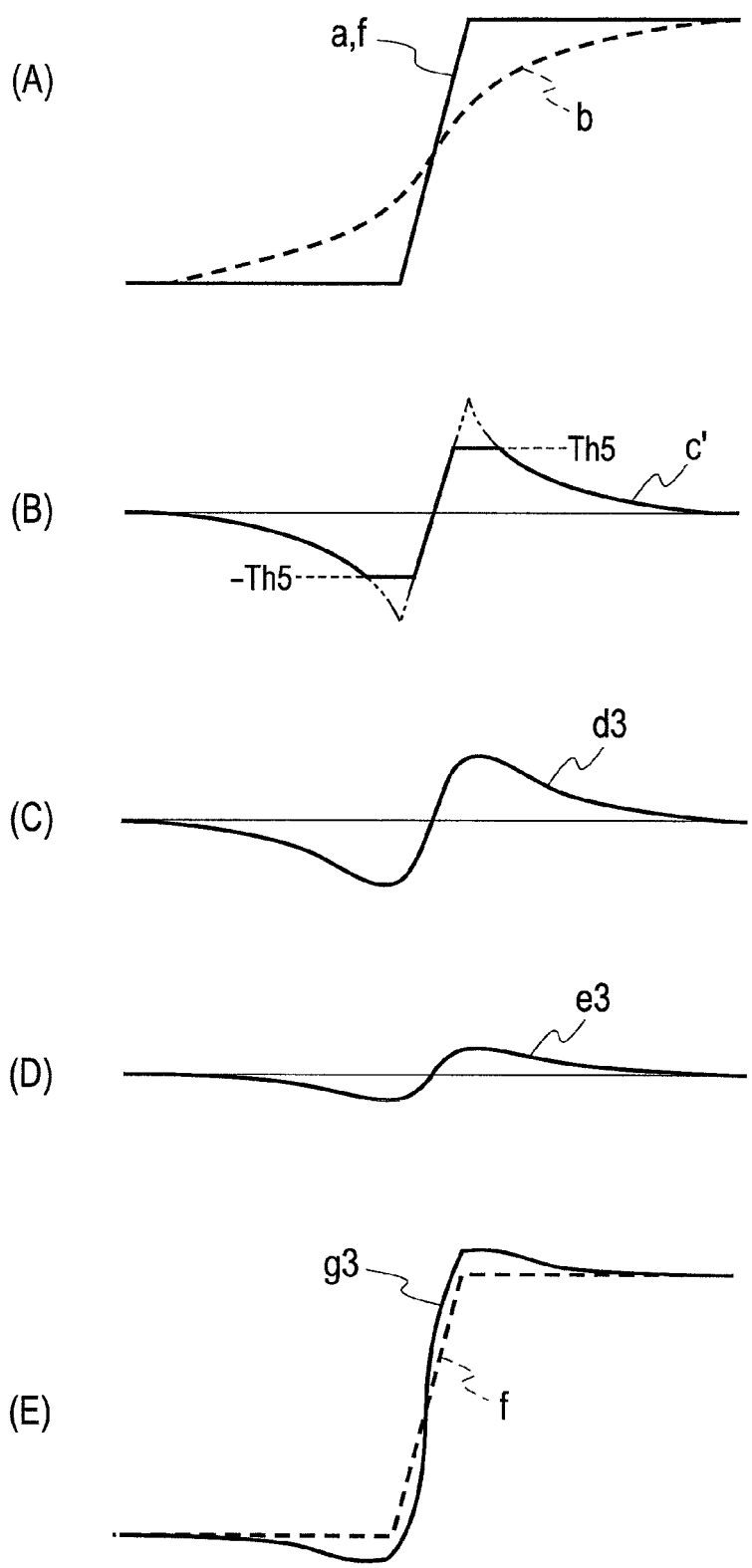
FIG. 10 is a waveform diagram for explaining the third embodiment.

FIG. 10 shows each signal waveform when the limiting characteristic of the limiter 8 is that in FIG. 7 in the image quality improving device 103. As shown in FIG. 10(B), the amplitude of the high frequency component signal c is limited by the threshold values Th5, −Th5, and therefore, the high frequency component signal c will have the waveform shown by the solid line. Then, the lower high frequency component signal d3 output from the low pass filter 5 will be as shown in FIG. 10(C) and the corrected component signal e3 output from the multiplier 6 will be as shown in FIG. 10(D). The corrected video signal g3 output from the adder 7 will be as shown by the solid line in FIG. 10(E).

With the image quality improving device 103 in the third embodiment also, the same effect as that of the image quality improving device 102 in the second embodiment can be obtained.

<Fourth Embodiment>

Figure 11:
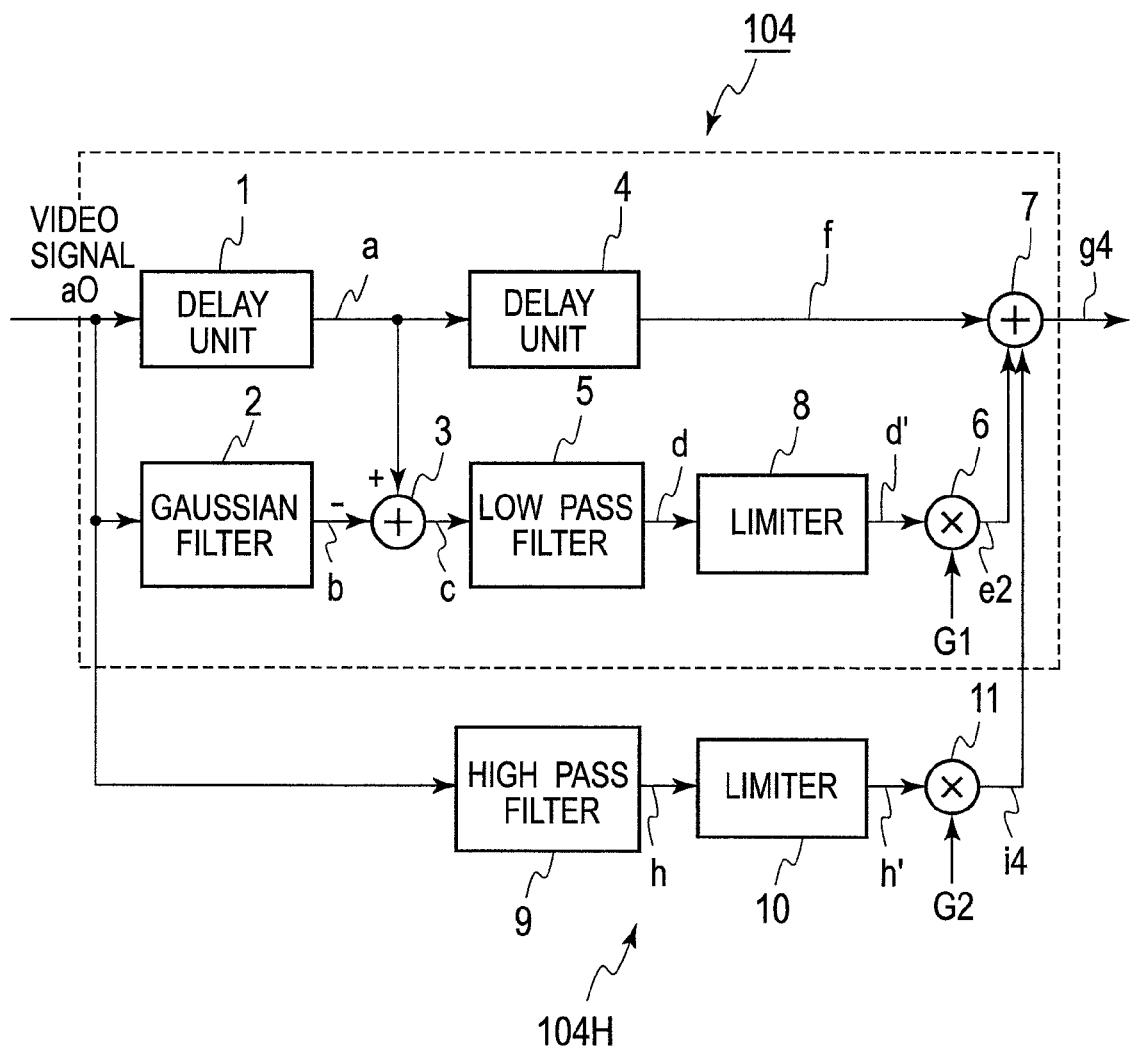
FIG. 11 is a block diagram showing a fourth embodiment of the present invention.

FIG. 11 is a block diagram showing a fourth embodiment of an image quality improving device of the present invention. In an image quality improving device 104 in the fourth embodiment shown in FIG. 11, the same symbol is attached to substantially the same part as that of the image quality improving device 102 in the second embodiment shown in FIG. 4 and its explanation is omitted appropriately. As shown in FIG. 11, the image quality improving device 104 in the fourth embodiment is provided with a low frequency image quality improving part 104L for emphasizing the low frequency component of a video signal and a high frequency image quality improving part 104H for emphasizing the high frequency component of a video signal connected in parallel. Here, the high frequency image quality improving part 104H is described as one that emphasizes the high frequency component, however, it is assumed that the case where the high frequency component is emphasized including the intermediate frequency component of a video signal is also included.

In FIG. 11, the low frequency image quality improving part 104L has the configuration equivalent to that of the image quality improving device 102 in the second embodiment. A high pass filter 9, a limiter 10, a multiplier 11, and the adder 7, which is a part of the low frequency image quality improving part 104L, configure the high frequency image quality improving part 104H. The high frequency image quality improving part 104H has the configuration equivalent to that of a general enhancer. A video signal input to the low frequency image quality improving part 104L is also input to the high pass filter 9 in a parallel manner. A frequency characteristic FH of the high pass filter 9 is as shown in FIG. 2 and the high pass filter 9 extracts the high frequency component of the video signal and supplies a high frequency component signal h to the limiter 10. The limiting characteristic of the limiter 10 is the same as that of the limiter 8 and limits the high frequency component signal h that is input and outputs it as a high frequency component signal h'. The multiplier 11 multiplies the high frequency component signal h' by a gain G2 and generates a high frequency corrected component signal i4.

The adder 7 adds the low frequency corrected component signal e2 output from the multiplier 6 and the high frequency corrected component signal i4 to the video signal f output from the delay unit 4 and outputs a corrected video signal g4.

According to the image quality improving device 104 in the fourth embodiment, it is possible to emphasize the low frequency component by the low frequency image quality improving part 104L, and therefore, the feeling of contrast can be improved and at the same time, it is possible to emphasize the high frequency component by the high frequency image quality improving part 104H, and therefore, the feeling of sharpness can be improved. Consequently, according to the image quality improving device 104 in the fourth embodiment, an image quality improving effect more significant compared to that of the conventional enhancer can be obtained. Here, the low frequency image quality improving part 104L has the configuration equivalent to that of the image quality improving device 102 in the second embodiment, however, it may be possible to have the configuration equivalent to that of the image quality improving device 103 in the third embodiment. The limiters 8, 10 may be eliminated as the case may be.

<Fifth Embodiment>

Figure 12:
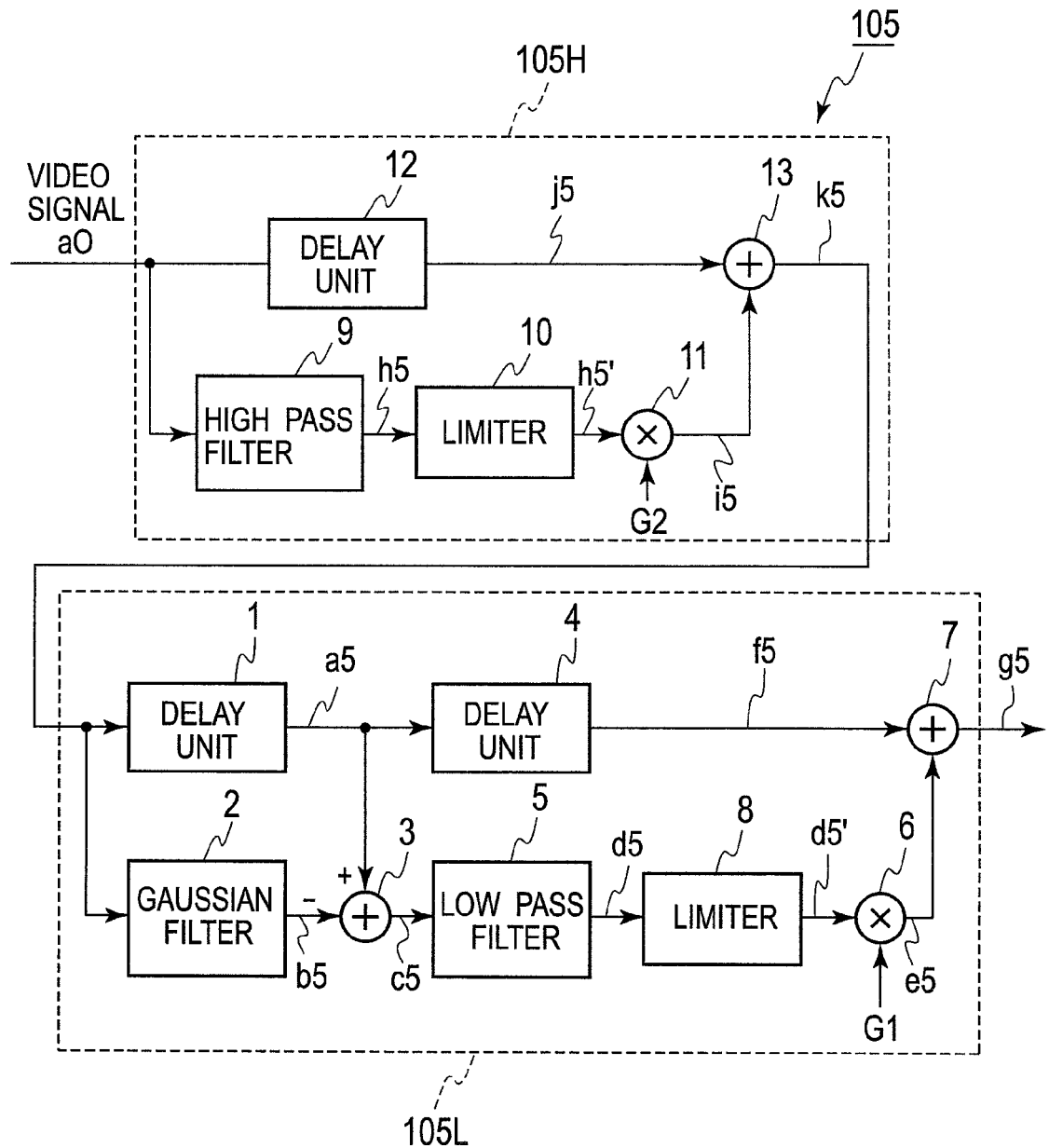
FIG. 12 is a block diagram showing a fifth embodiment of the present invention.

FIG. 12 is a block diagram showing a fifth embodiment of an image quality improving device of the present invention. In an image quality improving device 105 in the fifth embodiment shown in FIG. 12, the same symbol is attached to substantially the same part as that of the image quality improving device 102 in the second embodiment shown in FIG. 4 and the image quality improving device 104 in the fourth embodiment and its explanation is omitted appropriately. As shown in FIG. 12, the image quality improving device 105 in the fifth embodiment is provided with a high frequency image quality improving part 105H for emphasizing the high frequency component (or intermediate and high frequency components) of a video signal and a low frequency image quality improving part 105L for emphasizing the low frequency component of a video signal connected in series in this order. The high frequency image quality improving part 105H includes the high pass filter 9, the limiter 10, the multiplier 11, a delay unit 12, and an adder 13. The low frequency image quality improving part 105L has the configuration equivalent to that of the image quality improving device 102.

In FIG. 12, the video signal a0 is input to the delay unit 12 and the high pass filter 9. The high pass filter 9 extracts the high frequency component of the video signal a0 and supplies a high frequency component signal h5 to the limiter 10. The limiter 10 limits the high frequency component signal h5 that is input and outputs it as a high frequency component signal h5'. The multiplier 11 multiplies the high frequency component signal h5' by the gain G2 and generates a high frequency corrected component signal i5. The gain G2 is a positive number more than zero and there is a case where it is more than one. The delay unit 12 delays the video signal a0 that is input by a length of time required for the processing in the high pass filter 9, the limiter 10, and the multiplier 11 and thus generates a video signal j5. The adder 13 adds the corrected component signal i5 to the video signal j5 and outputs a video signal k5 in which the high frequency component is emphasized.

The video signal k5 in which the high frequency component is emphasized is input to the low frequency image quality improving part 105L. The delay unit 1 delays the video signal k5 to generate a video signal a5 and the delay unit 4 delays the video signal a5 to generate a video signal f5. The Gaussian filter 2 extracts a low frequency component signal b5 from the video signal k5 and the subtracter 3 outputs a high frequency component signal c5. The lower pass filter 5 extracts a lower high frequency component signal d5 from the high frequency component signal c5. The limiter 8 limits the lower high frequency component signal d5 to generate a lower high frequency component signal d5'. The multiplier 6 multiplies the lower high frequency component signal d5' by the gain G1 to generate a corrected component signal e5. The adder 7 adds the corrected component signal e5 to the video signal f5 and outputs a video signal g5 in which both the high frequency component and the low frequency component are emphasized.

According to the image quality improving device 105 in the fifth embodiment, it is possible to obtain the same effect as that of the image quality improving device 104 in the fourth embodiment. Here also, the low frequency image quality improving part 105L has the configuration equivalent to that of the image quality improving device 102 in the second embodiment, however, it may also be possible to have the configuration equivalent to that of the image quality improving device 103 in the third embodiment. The limiters 8, 10 may be eliminated as the case may be.

<Sixth Embodiment>

Figure 13:
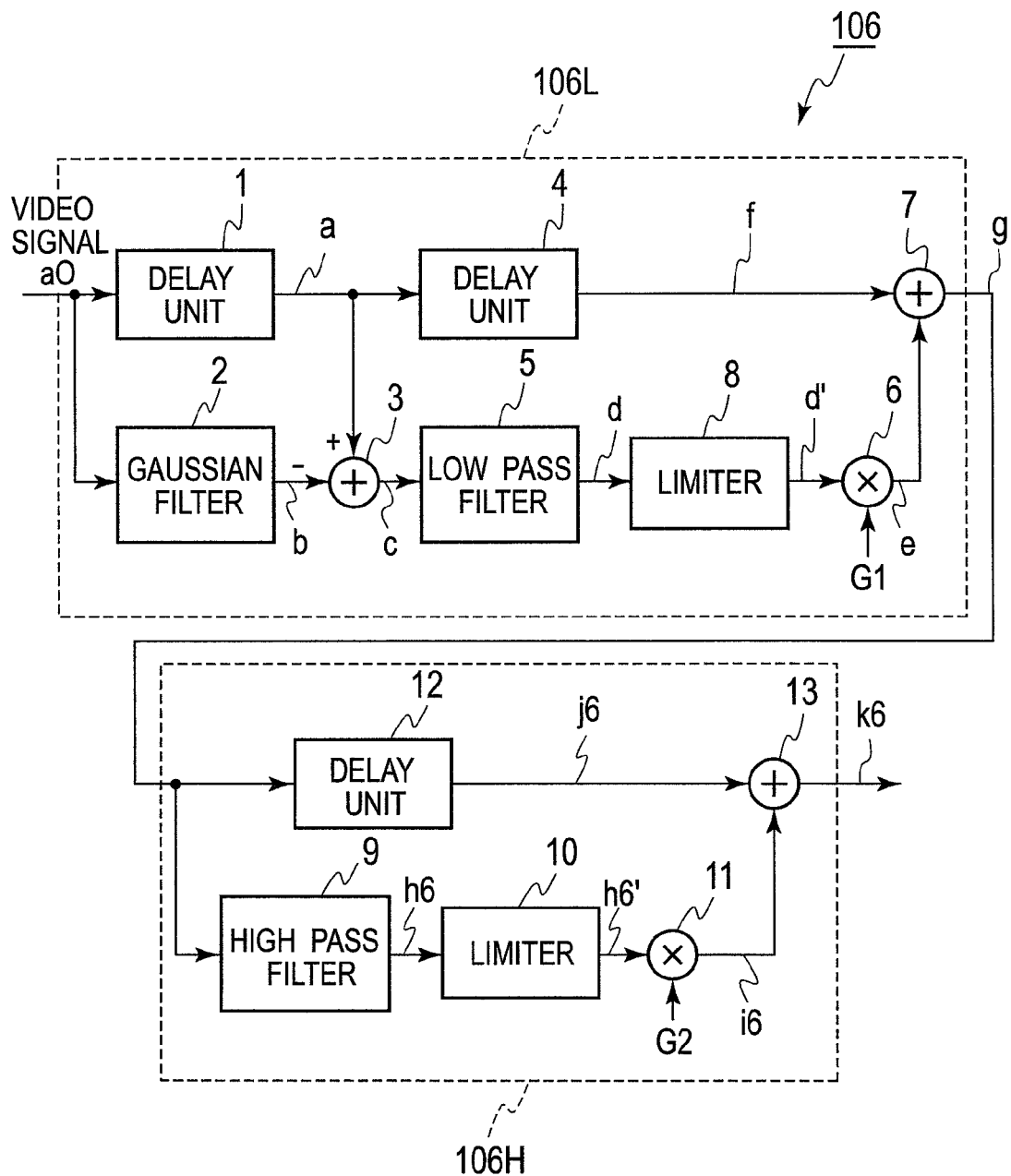
FIG. 13 is a block diagram showing a sixth embodiment of the present invention.

FIG. 13 is a block diagram showing a sixth embodiment of an image quality improving device of the present invention. In an image quality improving device 106 in the sixth embodiment shown in FIG. 13, the same symbol is attached to substantially the same part as that of the image quality improving device 102 in the second embodiment shown in FIG. 4 and the image quality improving device 105 in the fifth embodiment and its explanation is omitted appropriately. As shown in FIG. 13, the image quality improving device 106 in the sixth embodiment is provided with a low frequency image quality improving part 106L for emphasizing the low frequency component of a video signal and a high frequency image quality improving part 106H for emphasizing the high frequency component (or intermediate and high frequency components) of a video signal, connected in series in this order.

In FIG. 13, the corrected video signal g in which the low frequency component is emphasized and which is output from the adder 7 of the low frequency image quality improving part 106L is input to the high frequency image quality improving part 106H. The delay unit 12 delays the video signal g that is input by a length of time required for the processing in the high pass filter 9, the limiter 10, and the multiplier 11 to generate a video signal j6. The high pass filter 9 extracts the high frequency component of the video signal g and supplies a high frequency component signal h6 to the limiter 10. The limiter 10 limits the high frequency component signal h6 that is input and outputs it as a high frequency component signal h6'. The multiplier 11 multiplies the high frequency component signal h6' by the gain G2 to generate a high frequency corrected component signal i6. The adder 13 adds the corrected component signal i6 to the video signal j6 and outputs a video signal k6 in which both the low frequency component and the high frequency component are emphasized.

According to the image quality improving device 106 in the sixth embodiment, it is possible to obtain the same effect as that of the image quality improving device 104 in the fourth embodiment and that of the image quality improving device 105 in the fifth embodiment. Here also, the low frequency image quality improving part 106L has the configuration equivalent to that of the image quality improving device 102 in the second embodiment, however, it may also be possible to have the configuration equivalent to that of the image quality improving device 103 in the third embodiment. The limiters 8, 10 may be eliminated as the case may be.

The present invention is not limited to the present embodiments explained above and there can be various modifications within a scope not deviating from the gist of the present invention. The present invention may be configured by hardware or software. Further, both can be mixed in the configuration.

Industrial Applicability

According to the image quality improving device and method of the present invention, it is possible to improve the feeling of contrast. Further, it is possible to improve both the feeling of sharpness and the feeling of contrast.

Explanations of Referential Numbers 1, 4, 12: delay unit
2: Gaussian filter
3: subtracter
5: low pass filter
6, 11: multiplier
7, 13: adder
8, 10: limiter
9: high pass filter
101-106: image quality improving device
104L, 105L, 106L: low frequency image quality improving part
104H, 105H, 106H: high frequency image quality improving part

The invention claimed is:

1. An image quality improving device comprising:
a first low pass filter having a first cutoff frequency and extracting a low frequency component signal of a video signal that is input;
a subtracter extracting a first high frequency component signal by subtracting the low frequency component signal from the input video signal;
a second low pass filter having a second cutoff frequency higher than the first cutoff frequency and extracting a lower high frequency component signal, which is a low-frequency-side signal of the first high frequency component signal;
a first multiplier generating a first corrected component signal by multiplying the lower high frequency component signal by a first gain;
a high pass filter extracting a second high frequency component signal from the input video signal;
a second multiplier generating a second corrected component signal by multiplying the second high frequency component signal by a second gain; and
an adder adding the first and second corrected component signals to the input video signal.

2. The image quality improving device according to claim 1, wherein the first low pass filter is a Gaussian filter.

3. The image quality improving device according to claim 1, comprising a limiter limiting a value of the lower high frequency component signal by a predetermined limiting characteristic and supplying the value to the multiplier in the subsequent stage of the second low pass filter.

4. The image quality improving device according to claim 1, comprising a first limiter limiting a value of the first high frequency component signal by a predetermined limiting characteristic and supplying the value to the second low pass filter in the subsequent stage of the subtracter.

5. The image quality improving device according to claim 1, comprising a second limiter limiting a value of the second high frequency component signal by a predetermined limiting characteristic and supplying the value to the second multiplier in the subsequent stage of the high pass filer.

6. An image quality improving device comprising:
a high pass filter extracting a first high frequency component signal from a video signal that is input;
a first multiplier generating a first corrected component signal by multiplying the first high frequency component signal by a first gain;
a first adder adding the first corrected component signal to the input video signal;
a first low pass filter having a first cutoff frequency and extracting a low frequency component signal of a video signal output from the adder;
a subtracter extracting a second high frequency component signal by subtracting the low frequency component signal from the video signal output from the adder;
a second low pass filter having a second cutoff frequency higher than the first cutoff frequency and extracting a lower high frequency component signal, which is a low-frequency-side signal of the second high frequency component signal;
a second multiplier generating a second corrected component signal by multiplying the lower high frequency component signal by a second gain; and
a second adder adding the second corrected component signal to the video signal output from the adder.

7. The image quality improving device according to claim 6, wherein the first low pass filter is a Gaussian filter.

8. The image quality improving device according to claim 6, comprising a first limiter limiting a value of the lower high frequency component signal by a predetermined limiting characteristic and supplying the value to the second multiplier in the subsequent stage of the second low pass filter.

9. The image quality improving device according to claim 6, comprising a first limiter limiting a value of the second high frequency component signal by a predetermined limiting characteristic and supplying the value to the second low pass filter in the subsequent stage of the subtracter.

10. The image quality improving device according to claim 6, comprising a second limiter limiting a value of the first high frequency component signal by a predetermined limiting characteristic and supplying the value to the first multiplier in the subsequent stage of the high pass filer.

11. An image quality improving device comprising:
a first low pass filter having a first cutoff frequency and extracting a low frequency component signal of a video signal that is input;
a subtracter extracting a first high frequency component signal by subtracting the low frequency component signal from the input video signal;
a second low pass filter having a second cutoff frequency higher than the first cutoff frequency and extracting a lower high frequency component signal, which is a low-frequency-side signal of the first high frequency component signal;
a first multiplier generating a first corrected component signal by multiplying the lower high frequency component signal by a first gain;
a first adder adding the first corrected component signal to the input video signal;
a high pass filter extracting a second high frequency component signal from the video signal output from the first adder;
a second multiplier generating a second corrected component signal by multiplying the second high frequency component signal by a second gain; and
a second adder adding the second corrected component signal to the video signal output from the first adder.

12. The image quality improving device according to claim 11, wherein the first low pass filter is a Gaussian filter.

13. The image quality improving device according to claim 11, comprising a first limiter limiting a value of the lower high frequency component signal by a predetermined limiting characteristic and supplying the value to the first multiplier in the subsequent stage of the second low pass filter.

14. The image quality improving device according to claim 11, comprising a first limiter limiting a value of the first high frequency component signal by a predetermined limiting characteristic and supplying the value to the second low pass filter in the subsequent stage of the subtracter.

15. The image quality improving device according to claim 11, comprising a second limiter limiting a value of the second high frequency component signal by a predetermined limiting characteristic and supplying the value to the second multiplier in the subsequent stage of the high pass filer.

16. An image quality improving method comprising:
a first step of extracting a low frequency component signal of a video signal by a first low pass filter having a first cutoff frequency;
a second step of extracting a high frequency component signal by subtracting the low frequency component signal from the video signal;
a third step of extracting a lower high frequency component signal, which is a low-frequency-side signal of the high frequency component signal, by a second low pass filter having a second cutoff frequency higher than the first cutoff frequency;
a fourth step of generating a first corrected component signal by multiplying the lower high frequency component signal by a predetermined gain;
a fifth step of outputting a corrected video signal in which the band component of the lower high frequency component signal in the band of the video signal is emphasized by adding the first corrected component signal to the video signal; and
a sixth step of generating a second corrected component signal to emphasize a high frequency component in the band of the video signal, wherein
the fifth step adds both the first and second corrected component signals to the video signal to output a corrected video signal in which the band component of the lower high frequency component signal and the high frequency component are emphasized.

17. The image quality improving method according to claim 16, wherein the first low pass filter is a Gaussian filter.

18. The image quality improving method according to claim 16, comprising a seventh step of limiting a value of the lower high frequency component signal or the high frequency component signal by a predetermined limiting characteristic.

19. An image quality improving method comprising:
a first step of extracting a low frequency component signal of a video signal by a first low pass filter having a first cutoff frequency;
a second step of extracting a high frequency component signal by subtracting the low frequency component signal from the video signal;
a third step of extracting a lower high frequency component signal, which is a low-frequency-side signal of the high frequency component signal, by a second low pass filter having a second cutoff frequency higher than the first cutoff frequency;
a fourth step of generating a first corrected component signal by multiplying the lower high frequency component signal by a predetermined gain; and
a fifth step of outputting a corrected video signal in which the band component of the lower high frequency component signal in the band of the video signal is emphasized by adding the first corrected component signal to the video signal;
a sixth step of generating a second corrected component signal to emphasize the high frequency component in the band of the video signal; and
an seventh step of outputting a corrected video signal in which the high frequency component in the band of the video signal is emphasized by adding the second corrected component signal to the video signal, wherein
the first to fifth steps are performed in the subsequent stage of the sixth and seventh steps.

20. The image quality improving method according to claim 19, wherein the first low pass filter is a Gaussian filter.

21. The image quality improving method according to claim 19, comprising a eighth step of limiting a value of the lower high frequency component signal or the high frequency component signal by a predetermined limiting characteristic.

22. An image quality improving method comprising:
- a first step of extracting a low frequency component signal of a video signal by a first low pass filter having a first cutoff frequency;
- a second step of extracting a high frequency component signal by subtracting the low frequency component signal from the video signal;
- a third step of extracting a lower high frequency component signal, which is a low-frequency-side signal of the high frequency component signal, by a second low pass filter having a second cutoff frequency higher than the first cutoff frequency;
- a fourth step of generating a first corrected component signal by multiplying the lower high frequency component signal by a predetermined gain;
- a fifth step of outputting a corrected video signal in which the band component of the lower high frequency component signal in the band of the video signal is emphasized by adding the first corrected component signal to the video signal;
- a sixth step of generating a second corrected component signal to emphasize the high frequency component in the band of the video signal; and
- an seventh step of outputting a corrected video signal in which the high frequency component in the band of the video signal is emphasized by adding the second corrected component signal to the video signal, wherein
the first to fifth steps are performed in the precedent stage of the sixth and seventh steps.

23. The image quality improving method according to claim 22, wherein the first low pass filter is a Gaussian filter.

24. The image quality improving method according to claim 22, comprising a eighth step of limiting a value of the lower high frequency component signal or the high frequency component signal by a predetermined limiting characteristic.

* * * * *